(12) United States Patent
Bunea et al.

(10) Patent No.: US 12,413,174 B2
(45) Date of Patent: Sep. 9, 2025

(54) ROOFING SYSTEM INCLUDING PHOTOVOLTAIC MODULE WIREWAY COVER, AND ASSOCIATED METHOD

(71) Applicant: GAF Energy LLC, Parsippany, NJ (US)

(72) Inventors: Gabriela Bunea, San Jose, CA (US); Richard Perkins, San Jose, CA (US); Matthew Grigsby, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/436,773

(22) Filed: Feb. 8, 2024

(65) Prior Publication Data

US 2024/0283387 A1 Aug. 22, 2024

Related U.S. Application Data

(60) Provisional application No. 63/486,219, filed on Feb. 21, 2023.

(51) Int. Cl.
*H02S 20/23* (2014.01)
*H02S 40/36* (2014.01)

(52) U.S. Cl.
CPC .............. *H02S 20/23* (2014.12); *H02S 40/36* (2014.12)

(58) Field of Classification Search
None
See application file for complete search history.

(56) References Cited

U.S. PATENT DOCUMENTS

| | | | |
|---|---|---|---|
| 1,981,467 | A | 11/1934 | Radtke |
| 3,156,497 | A | 11/1964 | Lessard |
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Eli S Mekhlin
(74) *Attorney, Agent, or Firm* — GREENBERG TRAURIG, LLP

(57) ABSTRACT

A system, including: a roof deck; a first photovoltaic module above the roof deck, where the first photovoltaic module includes: a first solar cell, where the first photovoltaic module includes a first end, a second end opposite the first end; a first wireway portion above the roof deck, where the first wireway portion is proximate the first end of the first photovoltaic module; and a first cover, where the first cover is removably attached to the first wireway portion, where the first cover comprises: a second solar cell.

20 Claims, 2 Drawing Sheets

(56) References Cited

U.S. PATENT DOCUMENTS

| | | | |
|---|---|---|---|
| 4,636,577 A | 1/1987 | Peterpaul | |
| 5,167,579 A | 12/1992 | Rotter | |
| 5,437,735 A | 8/1995 | Younan et al. | |
| 5,590,495 A | 1/1997 | Bressler et al. | |
| 5,642,596 A | 7/1997 | Waddington | |
| 5,768,831 A * | 6/1998 | Melchior | F24S 20/69 52/522 |
| 6,008,450 A | 12/1999 | Ohtsuka et al. | |
| 6,033,270 A | 3/2000 | Stuart | |
| 6,046,399 A | 4/2000 | Kapner | |
| 6,201,180 B1 | 3/2001 | Meyer et al. | |
| 6,220,329 B1 | 4/2001 | King et al. | |
| 6,308,482 B1 | 10/2001 | Strait | |
| 6,320,114 B1 | 11/2001 | Kuechler | |
| 6,320,115 B1 | 11/2001 | Kataoka et al. | |
| 6,336,304 B1 | 1/2002 | Mimura et al. | |
| 6,341,454 B1 | 1/2002 | Koleoglou | |
| 6,407,329 B1 | 6/2002 | Iino et al. | |
| 6,576,830 B2 | 6/2003 | Nagao et al. | |
| 6,928,781 B2 | 8/2005 | Desbois et al. | |
| 6,972,367 B2 | 12/2005 | Federspiel et al. | |
| 7,138,578 B2 | 11/2006 | Komamine | |
| 7,155,870 B2 | 1/2007 | Almy | |
| 7,178,295 B2 | 2/2007 | Dinwoodie | |
| 7,487,771 B1 | 2/2009 | Eiffert et al. | |
| 7,587,864 B2 | 9/2009 | McCaskill et al. | |
| 7,678,990 B2 | 3/2010 | McCaskill et al. | |
| 7,678,991 B2 | 3/2010 | McCaskill et al. | |
| 7,748,191 B2 | 7/2010 | Podirsky | |
| 7,819,114 B2 | 10/2010 | Augenbraun et al. | |
| 7,824,191 B1 | 11/2010 | Podirsky | |
| 7,832,176 B2 | 11/2010 | McCaskill et al. | |
| 8,118,109 B1 | 2/2012 | Hacker | |
| 8,168,880 B2 | 5/2012 | Jacobs et al. | |
| 8,173,889 B2 | 5/2012 | Kalkanoglu et al. | |
| 8,210,570 B1 | 7/2012 | Railkar et al. | |
| 8,276,329 B2 | 10/2012 | Lenox | |
| 8,312,693 B2 | 11/2012 | Cappelli | |
| 8,319,093 B2 | 11/2012 | Kalkanoglu et al. | |
| 8,333,040 B2 | 12/2012 | Shiao et al. | |
| 8,371,076 B2 | 2/2013 | Jones et al. | |
| 8,375,653 B2 | 2/2013 | Shiao et al. | |
| 8,404,967 B2 | 3/2013 | Kalkanoglu et al. | |
| 8,410,349 B2 | 4/2013 | Kalkanoglu et al. | |
| 8,418,415 B2 | 4/2013 | Shiao et al. | |
| 8,438,796 B2 | 5/2013 | Shiao et al. | |
| 8,468,754 B2 | 6/2013 | Railkar et al. | |
| 8,468,757 B2 | 6/2013 | Krause et al. | |
| 8,505,249 B2 | 8/2013 | Geary | |
| 8,512,866 B2 | 8/2013 | Taylor | |
| 8,513,517 B2 | 8/2013 | Kalkanoglu et al. | |
| 8,586,856 B2 | 11/2013 | Kalkanoglu et al. | |
| 8,601,754 B2 | 12/2013 | Jenkins et al. | |
| 8,629,578 B2 | 1/2014 | Kurs et al. | |
| 8,646,228 B2 | 2/2014 | Jenkins | |
| 8,656,657 B2 | 2/2014 | Livsey et al. | |
| 8,671,630 B2 | 3/2014 | Lena et al. | |
| 8,677,702 B2 | 3/2014 | Jenkins | |
| 8,695,289 B2 | 4/2014 | Koch et al. | |
| 8,713,858 B1 | 5/2014 | Xie | |
| 8,713,860 B2 | 5/2014 | Railkar et al. | |
| 8,733,038 B2 | 5/2014 | Kalkanoglu et al. | |
| 8,776,455 B2 | 7/2014 | Azoulay | |
| 8,789,321 B2 | 7/2014 | Ishida | |
| 8,793,940 B2 | 8/2014 | Kalkanoglu et al. | |
| 8,793,941 B2 | 8/2014 | Bosler et al. | |
| 8,826,607 B2 | 9/2014 | Shiao et al. | |
| 8,835,751 B2 | 9/2014 | Kalkanoglu et al. | |
| 8,863,451 B2 | 10/2014 | Jenkins et al. | |
| 8,898,970 B2 | 12/2014 | Jenkins et al. | |
| 8,925,262 B2 | 1/2015 | Railkar et al. | |
| 8,943,766 B2 | 2/2015 | Gombarick et al. | |
| 8,946,544 B2 | 2/2015 | Jabos et al. | |
| 8,950,128 B2 | 2/2015 | Kalkanoglu et al. | |
| 8,959,848 B2 | 2/2015 | Jenkins et al. | |
| 8,966,838 B2 | 3/2015 | Jenkins | |
| 8,966,850 B2 | 3/2015 | Jenkins et al. | |
| 8,994,224 B2 | 3/2015 | Mehta et al. | |
| 9,032,672 B2 | 5/2015 | Livsey et al. | |
| 9,153,950 B2 | 10/2015 | Yamanaka et al. | |
| 9,166,087 B2 | 10/2015 | Chihlas et al. | |
| 9,169,646 B2 | 10/2015 | Rodrigues et al. | |
| 9,170,034 B2 | 10/2015 | Bosler et al. | |
| 9,178,465 B2 | 11/2015 | Shiao et al. | |
| 9,202,955 B2 | 12/2015 | Livsey et al. | |
| 9,212,832 B2 | 12/2015 | Jenkins | |
| 9,217,584 B2 | 12/2015 | Kalkanoglu et al. | |
| 9,270,221 B2 | 2/2016 | Zhao | |
| 9,273,885 B2 | 3/2016 | Rordigues et al. | |
| 9,276,141 B2 | 3/2016 | Kalkanoglu et al. | |
| 9,331,224 B2 | 5/2016 | Koch et al. | |
| 9,356,174 B2 | 5/2016 | Duarte et al. | |
| 9,359,014 B1 | 6/2016 | Yang et al. | |
| 9,412,890 B1 | 8/2016 | Meyers | |
| 9,528,270 B2 | 12/2016 | Jenkins et al. | |
| 9,605,432 B1 | 3/2017 | Robbins | |
| 9,711,672 B2 | 7/2017 | Wang | |
| 9,755,573 B2 | 9/2017 | Livsey et al. | |
| 9,786,802 B2 | 10/2017 | Shiao et al. | |
| 9,831,818 B2 | 11/2017 | West | |
| 9,912,284 B2 | 3/2018 | Svec | |
| 9,923,515 B2 | 3/2018 | Rodrigues et al. | |
| 9,938,729 B2 | 4/2018 | Coon | |
| 9,991,412 B2 | 6/2018 | Gonzalez et al. | |
| 9,998,067 B2 | 6/2018 | Kalkanoglu et al. | |
| 10,027,273 B2 | 7/2018 | West et al. | |
| 10,115,850 B2 | 10/2018 | Rodrigues et al. | |
| 10,128,660 B1 | 11/2018 | Apte et al. | |
| 10,156,075 B1 | 12/2018 | McDonough | |
| 10,187,005 B2 | 1/2019 | Rodrigues et al. | |
| 10,256,765 B2 | 4/2019 | Rodrigues et al. | |
| 10,284,136 B1 | 5/2019 | Mayfield et al. | |
| 10,454,408 B2 | 10/2019 | Livsey et al. | |
| 10,530,292 B1 | 1/2020 | Cropper et al. | |
| 10,560,048 B2 | 2/2020 | Fisher et al. | |
| 10,563,406 B2 | 2/2020 | Kalkanoglu et al. | |
| D879,031 S | 3/2020 | Lance et al. | |
| 10,579,028 B1 | 3/2020 | Jacob | |
| 10,784,813 B2 | 9/2020 | Kalkanoglu et al. | |
| D904,289 S | 12/2020 | Lance et al. | |
| 11,012,026 B2 | 5/2021 | Kalkanoglu et al. | |
| 11,177,639 B1 | 11/2021 | Nguyen et al. | |
| 11,217,715 B2 | 1/2022 | Sharenko et al. | |
| 11,251,744 B1 | 2/2022 | Bunea et al. | |
| 11,258,399 B2 | 2/2022 | Kalkanoglu et al. | |
| 11,283,394 B2 | 3/2022 | Perkins et al. | |
| 11,309,828 B2 | 4/2022 | Sirski et al. | |
| 11,394,344 B2 | 7/2022 | Perkins et al. | |
| 11,424,379 B2 | 8/2022 | Sharenko et al. | |
| 11,431,280 B2 | 8/2022 | Liu et al. | |
| 11,431,281 B2 | 8/2022 | Perkins et al. | |
| 11,444,569 B2 | 9/2022 | Clemente et al. | |
| 11,454,027 B2 | 9/2022 | Kuiper et al. | |
| 11,459,757 B2 | 10/2022 | Nguyen et al. | |
| 11,486,144 B2 | 11/2022 | Bunea et al. | |
| 11,489,482 B2 | 11/2022 | Peterson et al. | |
| 11,496,088 B2 | 11/2022 | Sirski et al. | |
| 11,508,861 B1 | 11/2022 | Perkins et al. | |
| 11,512,480 B1 | 11/2022 | Achor et al. | |
| 11,527,665 B2 | 12/2022 | Boitnott | |
| 11,545,927 B2 | 1/2023 | Abra et al. | |
| 11,545,928 B2 | 1/2023 | Perkins et al. | |
| 11,658,470 B2 | 5/2023 | Nguyen et al. | |
| 11,661,745 B2 | 5/2023 | Bunea et al. | |
| 11,689,149 B2 | 6/2023 | Clemente et al. | |
| 11,705,531 B2 | 7/2023 | Sharenko et al. | |
| 11,728,759 B2 | 8/2023 | Nguyen et al. | |
| 11,732,490 B2 | 8/2023 | Achor et al. | |
| 11,811,361 B1 | 11/2023 | Farhangi et al. | |
| 11,824,486 B2 | 11/2023 | Nguyen et al. | |
| 11,824,487 B2 | 11/2023 | Nguyen et al. | |
| 11,843,067 B2 | 12/2023 | Nguyen et al. | |
| 2002/0053360 A1 | 5/2002 | Kinoshita et al. | |
| 2002/0129849 A1 | 9/2002 | Heckeroth | |

(56) References Cited

U.S. PATENT DOCUMENTS

| | | |
|---|---|---|
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2008/0315061 A1 | 12/2008 | Placer et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1* | 3/2011 | Livsey .................. H02S 20/23 52/173.3 |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |

(56) References Cited

FOREIGN PATENT DOCUMENTS

| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

ROOFING SYSTEM INCLUDING PHOTOVOLTAIC MODULE WIREWAY COVER, AND ASSOCIATED METHOD

CROSS-REFERENCE TO RELATED APPLICATION

This application claims priority to U.S. provisional application No. 63/486,219, titled "ROOFING SYSTEM INCLUDING PHOTOVOLTAIC MODULE WIREWAY COVER, AND ASSOCIATED METHOD," filed Feb. 21, 2023, the disclosure of which is incorporated by reference herein in its entirety.

FIELD

The present invention relates to a roofing system, and, more particularly, to a roofing system that includes a photovoltaic module, a wireway, and a wireway cover.

BACKGROUND

Photovoltaic systems having solar panels are commonly installed on roofing of structures.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as each claim.

In some embodiments, the present invention provides a system, comprising: a roof deck; a first photovoltaic module above the roof deck, wherein the first photovoltaic module comprises a first solar cell, wherein the first photovoltaic module includes a first end, a second end opposite the first end, a first edge extending between the first end and the second end, and a second edge opposite the first edge, and extending between the first end and the second end; a first wireway portion above the roof deck, wherein the first wireway portion is proximate the first end of the first photovoltaic module; and a first cover, wherein the first cover is removably attached to the first wireway portion, wherein the first cover comprises a second solar cell.

In some embodiments, the first photovoltaic module further comprises: a third solar cell, and a first ribbon, wherein the first solar cell is proximate the first end of the first photovoltaic module, wherein the third solar cell is proximate the first solar cell, wherein the first ribbon extends between the first solar cell and the third solar cell in a first direction, wherein the first ribbon is in electrical communication with the first solar cell and the third solar cell, and wherein the first cover further comprises: a fourth solar cell, and a second ribbon, wherein the second ribbon extends between the second solar cell and the fourth solar cell in a second direction, wherein the second ribbon is in electrical communication with the second solar cell and the fourth solar cell, wherein the second direction is different than the first direction.

In some embodiments, the second direction is perpendicular to the first direction.

In some embodiments, the system further comprises: a second photovoltaic module above the roof deck, wherein the second photovoltaic module comprises: a third solar cell; a second wireway portion above the roof deck, wherein one side of the second wireway portion is proximate an end of the second photovoltaic module, wherein another side of the second wireway portion is proximate a side of the first wireway portion; and a second cover, wherein the second cover is removably attached to the second wireway portion, wherein the second cover comprises a fourth solar cell.

In some embodiments, the system further comprises: a second photovoltaic module above the roof deck, wherein the second photovoltaic module comprises: a third solar cell, wherein a portion of second photovoltaic module is proximate the second edge of the first photovoltaic module, wherein the first wireway portion is proximate an end of the second photovoltaic module, wherein the first cover further comprises: a fourth solar cell, wherein the fourth solar cell is in electrical communication with the second solar cell.

In some embodiments, the system further comprises: a first wire, wherein the first wire is in electrical communication with the first solar cell of the first photovoltaic module and the second solar cell of the first wireway portion; and a second wire, wherein the second wire is in electrical communication with the third solar cell of the second photovoltaic module and the first solar cell of the first photovoltaic module, and wherein an uppermost end of the ribbon is in electrical communication with the first solar cell of the first photovoltaic module.

In some embodiments, the system further comprises: a second photovoltaic module above the roof deck, wherein the second photovoltaic module comprises: a third solar cell, wherein a bottom edge of the second photovoltaic module is proximate the second edge of the first photovoltaic module; a third photovoltaic module above the roof deck, wherein the third photovoltaic module comprises: a fourth solar cell, wherein a bottom edge of the third photovoltaic module is proximate a top edge of the second photovoltaic module; and a second wireway portion above the roof deck, wherein one side of the second wireway portion is proximate an end of the third photovoltaic module; and wherein the first cover further comprises: a fifth solar cell, and a ribbon, wherein the ribbon extends between the second solar cell and the fifth solar cell, wherein the ribbon is in electrical communication with the second solar cell and the fifth solar cell, wherein the first cover is removably attached to the first and second wireway portions.

In some embodiments, the system further comprises: a first wire, wherein the first wire, wherein the first wire is in electrical communication with the first solar cell of the first photovoltaic module and the second solar cell of the first cover; a second wire, wherein the second wire is in electrical communication with the first solar cell of the first photovoltaic module and the third solar cell of the second photovoltaic module; and a third wire, wherein the third wire is in electrical communication with the fourth solar cell of the third photovoltaic module and the third solar cell of the second photovoltaic module.

In some embodiments, the first cover comprises: a top surface, wherein the top surface comprises a channel, wherein the second solar cell is within the channel.

In some embodiments, the first wireway portion comprises at least one slot, wherein the first cover comprises at least one rail, wherein the at least one rail is removably retained within the at least one slot.

In some embodiments, the present invention provides a method, comprising: obtaining a first photovoltaic module, wherein the first photovoltaic module comprises: a first solar cell, wherein the first photovoltaic module includes a first end, a second end opposite the first end, a first edge extending between the first end and the second end, and a second edge opposite the first edge, and extending between the first end and the second end; obtaining a first wireway portion; obtaining a first cover, wherein the first cover comprises: a second solar cell; installing the first photovoltaic module above the roof deck; installing the first wireway portion above the roof deck, such that the first wireway portion is proximate the first end of the first photovoltaic module; and removably attaching the first cover to the first wireway portion.

In some embodiments, the method further comprises: obtaining a second photovoltaic module, wherein the second photovoltaic module comprises: a third solar cell; obtaining a second wireway portion; obtaining a second cover, wherein the second cover comprises a fourth solar cell; installing the second photovoltaic module above the roof deck; installing the second wireway portion above the roof deck, such that one side of the second wireway portion is proximate an end of the second photovoltaic module; and removably attaching the second cover to the second wireway portion.

In some embodiments, the method further comprises: obtaining a second photovoltaic module, wherein the second photovoltaic module comprises: a third solar cell; and installing the second photovoltaic module above the roof deck, such that a portion of second photovoltaic module is proximate the second edge of the first photovoltaic module, and an end of the second photovoltaic module is proximate the first wireway portion.

In some embodiments, the first cover further comprises: a fourth solar cell, wherein the fourth solar cell is in electrical communication with the second solar cell; and the method further comprises: obtaining a first wire; obtaining a second wire; installing the first wire to electrically connect the first solar cell of the first photovoltaic module and the second solar cell of the first wireway portion; and installing the second wire to electrically connect the third solar cell of the second photovoltaic module and the first solar cell of the first photovoltaic module.

In some embodiments, the first cover further comprises: a fifth solar cell, and a ribbon, wherein the ribbon extends between the second solar cell and the fifth solar cell, wherein the ribbon is in electrical communication with the second solar cell and the fifth solar cell; wherein the method further comprises: obtaining a second photovoltaic module, wherein the second photovoltaic module comprises: a third solar cell; obtaining a third photovoltaic module, wherein the third photovoltaic module comprises: a fourth solar cell; obtaining a second wireway portion; installing the second photovoltaic module above the roof deck, such that a bottom edge of the second photovoltaic module is proximate the second edge of the first photovoltaic module; installing the third photovoltaic module above the roof deck, such that a bottom edge of the third photovoltaic module is proximate a top edge of the second photovoltaic module; installing the second wireway portion above the roof deck, such that one side of the second wireway portion is proximate an end of the third photovoltaic module, and another side of the second wireway portion is proximate a side of the first wireway portion; and removably attaching the first cover to the first and second wireway portions.

In some embodiments, the method further comprises: obtaining a first wire; obtaining a second wire; obtaining a third wire; installing the first wire to electrically connect the first solar cell of the first photovoltaic module and the second solar cell of the first cover; installing the second wire to electrically connect the first solar cell of the first photovoltaic module and the third solar cell of the second photovoltaic module; and installing the third wire to electrically connect the fourth solar cell of the third photovoltaic module and the third solar cell of the second photovoltaic module.

In some embodiments, the present invention provides a system, comprising: a roof deck; a first photovoltaic module above the roof deck, wherein the first photovoltaic module comprises a first solar cell, wherein the first photovoltaic module includes a first end, a second end opposite the first end, a first edge extending between the first end and the second end, and a second edge opposite the first edge, and extending between the first end and the second end; a second photovoltaic module proximate the first photovoltaic module above the roof deck, wherein the second photovoltaic module comprises a second solar cell, wherein the second photovoltaic module includes a first end, a second end opposite the first end, a first edge extending between the first end and the second end, and a second edge opposite the first edge, and extending between the first end and the second end; a first wireway portion above the roof deck, wherein the first wireway portion is proximate the first end of the first photovoltaic module; a second wireway portion above the roof deck, wherein the second wireway portion is proximate the first end of the second photovoltaic module; a first cover, wherein the first cover is removably attached to the first wireway portion and the second wireway portion, wherein the first cover comprises a third solar cell and a fourth solar cell; a first wire, wherein the first wire is in electrical communication with the first solar cell of the first photovoltaic module and the second solar cell of second solar cell of the second photovoltaic module; a second wire, wherein the second wire is in electrical communication with the first solar cell of the first photovoltaic module and the third solar cell of the cover; and a ribbon, wherein the ribbon is in electrical communication with the third solar cell of the cover and the fourth solar cell of the first cover, wherein the ribbon provides an electrical connection from a lower end of the first cover to an upper end of the first cover, and wherein the system does not include a return wire electrically connecting the lower end of the first cover to the upper end of the first cover.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION

Figure 1:
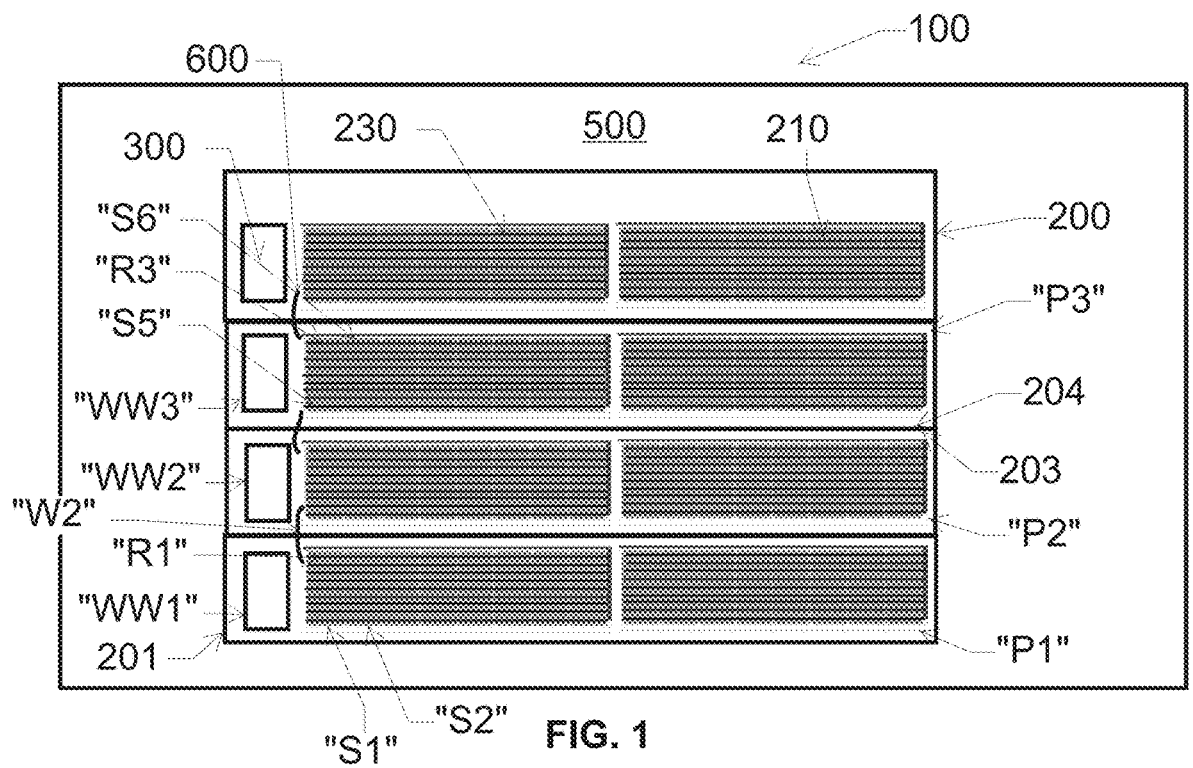
FIG. 1 shows a top view of an embodiment of a roofing system, in accordance with some embodiments of the invention.

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," and any similar phrase, do not limit the scope of a specific claim to the materials or steps recited by the claim.

As used herein, a "steep slope roof" is a roof that is disposed on a building, such as a house or other residential structure, having a pitch of Y/X, where Y and X are in a ratio of 4:12 to 20:12, where Y corresponds to the "rise" of the roof, and where X corresponds to the "run" of the roof.

As used herein, an "active" solar cell is a solar cell that converts light (such as, but not limited to, sunlight) into electricity by the photovoltaic effect.

As used herein, an "inactive" solar cell is one that does not convert light into electricity.

This application described components of a roofing system, including, for example a photovoltaic module, a wireway that is made up of wireway portions at ends of the photovoltaic modules, and a cover (also referred to as a wireway cover, and/or lid) on a roof deck. Any or all of these components, and/or other components, described herein may be in accordance with the corresponding description in U.S. Pat. No. 11,404,997, titled "Photovoltaic Shingles and Methods of Installing Same," issued Aug. 2, 2022; U.S. Pat. No. 11,251,744, titled "Photovoltaic Shingles and Methods of Installing Same," issued Feb. 15, 2022; and PCT International Patent Publication No. WO 2022/051593, Application No. PCT/US2021/049017, published Mar. 10, 2022, titled "Building Integrated Photovoltaic System," all of the foregoing owned by GAF Energy LLC, and the disclosures of each of the foregoing patent properties are incorporated by reference herein in their entireties. The roofing system may be installed on a steep slope roof, on a roof that is sloped but has a slope less than that of a steep slope roof, or on a flat roof (that is, a roof with minimal, or no slope).

In some embodiments, the present invention may provide a cover that includes at least one solar cell.

In some embodiments, the solar cell of the wireway cover may be electrically active—that is, the solar cell may convert light into electricity by the photovoltaic effect.

In some embodiments, the wireway portion may be proximate one of more photovoltaic modules on the roof deck. In some embodiments, the wireway portion may include an interior, in which may be disposed one or more components associated with control and/or operation of the photovoltaic modules. In some embodiments, one or more of the wireways may omit any or all of these components, and/or of another component or components, disposed within its interior. In some embodiments, ends of the wireway portions may be proximate one another, such that the wireway portions form a wireway.

Figure 2:
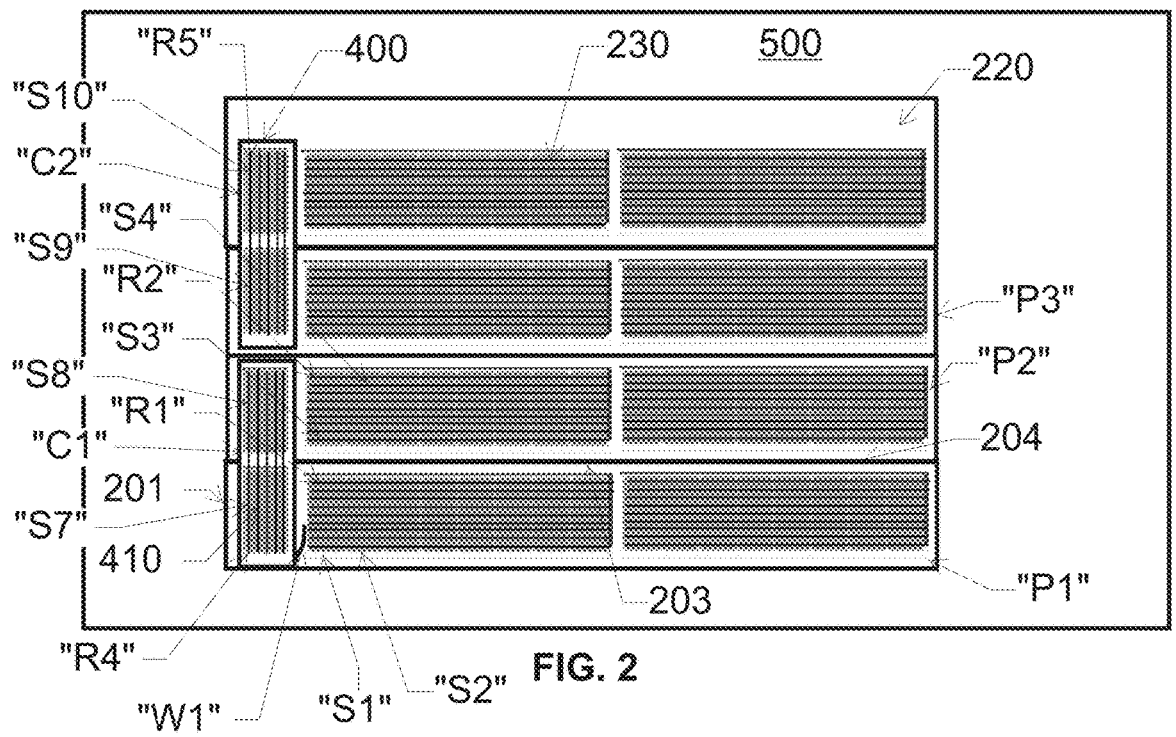
FIG. 2 shows a top view of an embodiment of a roofing system, in accordance with some embodiments of the invention.
Figure 3:
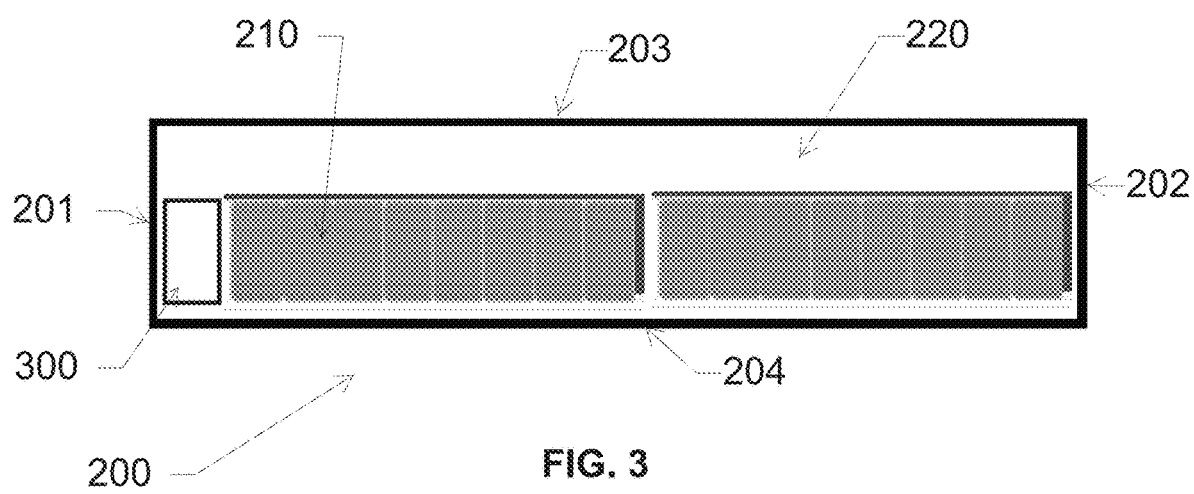
FIG. 3 shows a top view of an embodiment of a photovoltaic module, in accordance with some embodiments of the invention.

FIGS. 1 and 2 show top views of embodiments of a roofing system installed above a roof deck, where FIG. 2 includes a cover, while FIG. 1 does not include a cover; and FIG. 3 shows a top view of an embodiment of a photovoltaic module, in accordance with some embodiments of the invention.

As the figures illustrate, in some embodiments, a roofing system 100 may include one or more photovoltaic modules 200, one or more wireway portions 300, where one or more sides of the wireway portions 300 are proximate portions of the photovoltaic modules 200, and one or more covers 400, installed above a roof deck 500. As discussed, any or all of the photovoltaic module 200, the wireway portion 300, and the cover 400 may be in accordance with the corresponding description in U.S. Pat. No. 11,404,997, titled "Photovoltaic Shingles and Methods of Installing Same," issued Aug. 2, 2022; U.S. Pat. No. 11,251,744, titled "Photovoltaic Shingles and Methods of Installing Same," issued Feb. 15, 2022; and PCT International Patent Publication No. WO 2022/051593, Application No. PCT/US2021/049017, published Mar. 10, 2022, titled "Building Integrated Photovoltaic System," all of the foregoing owned by GAF Energy LLC, and the disclosures of each of the foregoing patent properties are incorporated by reference herein in their entireties.

Although not shown in the drawings, in some embodiments, the roofing system 100 may include other components, such as but not limited to an underlayment (such as between the photovoltaic modules 200 and the roof deck 500), and/or non-photovoltaic roofing modules (for example, roofing shingles without any solar cell), proximate or spaced apart from the photovoltaic modules 200.

In some embodiments, the roofing system 100 may include one photovoltaic module 200. In some embodiments, the roofing system 100 may include two or more photovoltaic modules 200. In some embodiments, the number of photovoltaic modules 200 in the roofing system 100 may be limited by the area of the roof deck 500 and the area of the photovoltaic module(s) 200.

In some embodiments, any or all of the photovoltaic modules 200 may include at least one solar cell 210. In some embodiments, the at least one solar cell 210 may be above a backsheet 220 of the photovoltaic module. In some embodiments, the backsheet 220 may be a nailable backsheet—that is, the backsheet 220 may be attachable to the roof deck 500 by one or more of the following types of mechanical fasteners that pierce the backsheet 220 and/or the roof deck 500: one or more nails; one or more screws; one or more staples; and/or one or more rivets; and/or combinations or one or more of these fasteners. In some embodiments, the backsheet 220 may not be a nailable backsheet. In some embodiments, whether or not the backsheet 220 is nailable, the backsheet may be attachable to the roof deck 500 by one or more of welding (heat and/or ultrasonic, for example), and/or adhering using an adhesive.

In some embodiments, the at least one solar cell 210 may be attachable to the backsheet 220, and/or to another component or layer of the backsheet 220, by one or more of: a mechanical fastener of fasteners, welding (heat and/or ultrasonic, for example), adhering using an adhesive, and/or laminating.

In some embodiments, the at least one solar cell 210 may be indirectly attached to the backsheet 220—that is, there may be at least one intervening layer between the at least one solar cell 210 and the backsheet 220. In some embodiments, there may be one intervening layer between the at least one solar cell 210 and the backsheet 220. In some embodiments, there may be two or more intervening layers between the at least one solar cell 210 and the backsheet 220. In some embodiments, there may be at least two intervening layers between the at least one solar cell 210 and the backsheet 220.

In some embodiments, as shown in the figures, the photovoltaic module 200 may include two sets of the solar cells 210, where each set of the solar cells 210 includes eight (8) of the solar cells 210, where the sets of the solar cells 210 are separated from each other by a space. In some embodiments, however, the photovoltaic module 200 may include one set of the solar cells 210, or more than two sets of the solar cells 210. In some embodiments, each of the sets of the solar cells 210 may include less than eight of the solar cells 210, or more than eight of the solar cells 210. In some embodiments, the sets of the solar cells 210 may have a different number (or the same number) of the solar cells 210 as another set or other sets of the solar cells 210. In some embodiments, the sets of the solar cells 210 may not be separated from one another by a space.

In some embodiments, the photovoltaic module 200 includes at least one ribbon 230. In some embodiments, the ribbons 230 may extend between, and/or may electrically connect (that is, may be in electrical communication with), components of the photovoltaic module 200. In some embodiments, the ribbons 230 may extend between, and/or may electrically connect, the solar cells 210.

In some embodiments, as shown in the figures, each of the solar cells 210 may be attached to nine (9) of the ribbons 230. In some embodiments, each of the solar cells 210 may be attached to less than nine of the ribbons 230, or may be attached to more than nine of the ribbons 230. In some embodiments, different ones of the solar cells 210 may be attached to a different number of the ribbons 230 than one or more others of the solar cells 210; or may be attached to the same number of the ribbons 230 as some of the solar cells 210 as well as a different number of the ribbons 230 than others of the solar cells 210. In some embodiments, the ribbons 230 may connect to, may extend between, and/or may provide an electrical connection with, some of the solar cells 210.

By way of example, in some embodiments, as shown in the drawings, ribbon "R1" may extend between solar cell "S1" and solar cell "S2" of photovoltaic module "P1," thereby providing an electrical connection between solar cell "S1" and solar cell "S2." By way of another example, in some embodiments, as shown in the drawings, ribbon "R2" may extend between solar cell "S3" and solar cell "S4" of photovoltaic module "P2," thereby providing an electrical connection between solar cell "S3" and solar cell "S4." By way of another example, in some embodiments, as shown in the drawings, ribbon "R3" may extend between solar cell "S5" and solar cell "S6" of photovoltaic module "P3," thereby providing an electrical connection between solar cell "S5" and solar cell "S6."

In some embodiments, each of the photovoltaic modules 200 may have a first end 201 (for example, a left end), a second end 202 (for example, a right end), a first edge 203 (for example, a top edge), and a second edge 204 (for example, a bottom edge). In some embodiments, the first end 201 and the second end 202 may be opposite each other. In some embodiments, the first edge 203 may extend between the first end 201 and the second end 202. In some embodiments, the first edge 203 and the second edge 204 may be opposite one another, and the second edge 204 also may extend between the first end 201 and the second end 202.

In some embodiments, as shown in the drawings, the first edge 203 of photovoltaic module "P1" may be proximate the second edge 204 of photovoltaic module "P2." Also as shown, in some embodiments, the first edge 203 of photovoltaic module "P2" may be proximate the second edge 204 of photovoltaic module "P3."

As shown in FIGS. 1 and 2, in some embodiments, the roofing system 100 may include one or more wireway portions 300. In some embodiments, the roofing system 100 may include only one wireway portion 300, and thus the wireway portion 300 may be a wireway. In some embodiments, as the figures show, the roofing system 100 may include two or more wireway portions 300, wherein one end of one wireway portion 300 is proximate one end of another wireway portion 300, such that the wireway portions 300 forming the wireway. As discussed, in some embodiments, the wireway portion 300 may include one or more components associated with control and/or operation of the photovoltaic modules 200, and/or other components of the roofing system 100.

In some embodiments, as shown in the drawings, the wireway portion 300 may be installed on the photovoltaic module 200. In some embodiments, the wireway portion 300 may be installed on the backsheet 220 of the photovoltaic module 200. In some embodiments, the wireway portion 300 may be installed on another layer of the photovoltaic module 200. In some embodiments, the wireway portion 300 may be installed off of, while proximate, the photovoltaic module 200. In some embodiments, the wireway portion 300 may be installed off of, as well as spaced apart from, the photovoltaic module 200.

In some embodiments, the wireway portion 300 may be installed proximate an end portion of the photovoltaic module 200. Thus, as shown in the figures, in some embodiments, the wireway portion 300 may be installed proximate the first end 201 of the photovoltaic module 200. In some embodiments, the wireway portion 300 may be installed proximate the second end 202 of the photovoltaic module 200. In some embodiments, the wireway portion 300 may be installed proximate the first edge 203 of the photovoltaic module 200. In some embodiments, the wireway portion 300 may be installed proximate the second edge 204 of the photovoltaic module 200. In some embodiments, the wireway portion 300 may be installed spaced apart from the first end 201, the second end 202, the first edge 203, and/or the second edge 204 of the photovoltaic module 200.

By way of example, in some embodiments, as shown in the drawings, the first end 201 of photovoltaic module "P1" is proximate wireway portion "WW1." By way of further example, in some embodiments, the first end 201 of photovoltaic module "P2" is proximate wireway portion "WW2." By way of further example, the first end 201 of photovoltaic module "P3" is proximate wireway portion "WW3." By way of further examples, an end of wireway portion "WW1" is proximate an end of wireway portion "WW2," and an opposite end of wireway portion "WW2" is proximate an end of wireway portion "WW3."

As discussed, further details of some embodiments of the wireway portions 300 that form the wireway may be in accordance with the corresponding description in U.S. Pat. No. 11,404,997, titled "Photovoltaic Shingles and Methods of Installing Same," issued Aug. 2, 2022; U.S. Pat. No. 11,251,744, titled "Photovoltaic Shingles and Methods of Installing Same," issued Feb. 15, 2022; and PCT International Patent Publication No. WO 2022/051593, Application No. PCT/US2021/049017, published Mar. 10, 2022, titled "Building Integrated Photovoltaic System," all of the foregoing owned by GAF Energy LLC, and the disclosures of each of the foregoing patent properties are incorporated by reference herein in their entireties.

As shown in FIGS. 1 and 2, in some embodiments, the roofing system 100 may one or more covers 400. In some embodiments, the roofing system 100 may include one cover 400. In some embodiments, the roofing system 100 may include more than one cover 400. In some embodiments, the roofing system 100 may include one cover 400 that is sized (that is, has a length sufficient) to cover all of the wireway portions 300 of the roofing system 100. In some embodiments, the roofing system 100 may include multiple covers 400 to cover all of the wireway portions 300 of the roofing system 100. In some embodiments, the roofing system 100 may include multiple covers 400 of the same length. In some embodiments, the roofing system 100 may include multiple covers 400 of different lengths.

In some embodiments, as shown in the drawings, the cover 400 may be installed on the photovoltaic module 200. In some embodiments, as shown in the drawings, the cover 400 may be installed on the wireway portion 300. In some embodiments, the cover 400 may be removably installed (that is, may be able to be removed without damage to either or both of the cover 400 and/or the wireway portion 300) on the wireway portion 300. In some embodiments, the cover 400 may be permanently or irremovably installed on the wireway portion 300.

In some embodiments, the cover 400 may be installed on one wireway portion 300. In some embodiments, the cover 400 may be installed on two wireway portions 300. In some embodiments, the cover 400 may be installed on more than two wireway portions 300. In some embodiments, a single cover 400 may be installed on each of the wireway portions 300 on the roof deck 500.

By way of example, in some embodiments, as shown in the drawings, cover "C1" is removably attached to wireway portion "WW1" as well as to wireway portion "WW2." By way of further example, in some embodiments, cover "C2" is removably attached to wireway portion "WW3." In some embodiments, one cover 400 may attach to one wireway portion 300, two wireway portions 300, three wireway portions 300, or all of the wireway portions 300 of the roofing system 100.

In some embodiments, either the wireway portion 300 or the cover 400 may include a rail, and the other one of the cover 400 and the wireway portion 300 may include a slot. Accordingly, in some embodiments, the rail is received at least partially within the slot, thereby to attach (removably or irremovably) the cover 400 to the wireway portion 300. In some embodiments, other cooperating fasteners may be included in either or both of the wireway portion 300 and the cover 400, thereby to permit removable or irremovable attachment of the cover 400 to the wireway portion 300.

As discussed, further details of some embodiments of the cover 400 may be in accordance with the corresponding description in U.S. Pat. No. 11,404,997, titled "Photovoltaic Shingles and Methods of Installing Same," issued Aug. 2, 2022; U.S. Pat. No. 11,251,744, titled "Photovoltaic Shingles and Methods of Installing Same," issued Feb. 15, 2022; and PCT International Patent Publication No. WO 2022/051593, Application No. PCT/US2021/049017, published Mar. 10, 2022, titled "Building Integrated Photovoltaic System," all of the foregoing owned by GAF Energy LLC, and the disclosures of each of the foregoing patent properties are incorporated by reference herein in their entireties.

As shown in the drawings, in some embodiments, the cover 400 may include at least one solar cell 410. In some embodiments, the cover 400 may include two solar cells 410. In some embodiments, depending on the length of the cover 400, for example, the cover 400 may include more than two solar cells 410. In some embodiments, the solar cells 410 may be disposed in a same orientation as one or more of the solar cells 210 of the photovoltaic modules 200 in the roofing system 100. In some embodiments, the solar cells 410 may be disposed in a same orientation as all of the solar cells 210 of the photovoltaic modules 200 in the roofing system 100. In some embodiments, the solar cells 410 may be disposed in a different orientation than at least one of the solar cells 210 of the photovoltaic modules 200 in the roofing system 100. In some embodiments, the solar cells may be disposed in a different orientation than all of the solar cells 210 of the photovoltaic modules 200 in the roofing system 100.

In some embodiments, the at least one solar cell 410 may be disposed on a top surface of the cover 400. In some embodiments, at least one solar cell 410 may be disposed within a channel or channels of the cover 400, such as a channel or channels in the top surface. In some embodiments, the one or more solar cells 410 may be secured, bonded, or fastened to the cover 400. In some embodiments, the one or more solar cells 410 may be mechanically fastened to the cover 400, such as by one or more nails, screws, rivets, and/or staples. In some embodiments, the one or more solar cells 410 may be adhered to the cover 400, such as by an adhesive. In some embodiments, the one or more solar cells 410 may be welded to the cover 400, such as by ultrasonic or heat welding. In some embodiments, the one or more solar cells 410 may be retained with the channel or channels of the cover 400 by friction. In some embodiments, the one or more solar cells 410 may be snap fit into the cover 400. In some embodiments, the one or more solar cells 410 may be adhered to a surface of the cover 400. In some embodiments, the one or more solar cells 410 may be removably attached to the cover 400 (that is, removable without damage to the cover 400 and/or the solar cell 410). In some embodiments, the one or more solar cells 410 may be irremovably attached to the cover 400 (that is, may not be removed without damage to the cover 400 and/or the solar cell 410).

As discussed, one or more of the solar cells 410 may be active solar cells—that is, may convert light into electricity. In some embodiments, all of the solar cells 410 of one of the covers 400 are active. In some embodiments, at least one of the solar cells 410 of one of the covers 400 is active, and at least one other solar cell 410 is inactive. In some embodiments, at least one solar cell 410 of the roofing system 100 is active. In some embodiments, all of the solar cells 410 in the roofing system 100 are active. In some embodiments, at least one of the solar cells 410 of the roofing system 100 is active, and at least one other solar cell 410 is inactive.

In some embodiments, each of the solar cells 410 may be attached to at least one ribbon 430. In some embodiments, as shown in the figures, each of the solar cells 410 may be attached to five (5) of the ribbons 430. In some embodiments, each of the solar cells 410 may be attached to less than five of the ribbons 430, or may be attached to more than five of the ribbons 430. In some embodiments, different ones of the solar cells 410 may be attached to a different number of the ribbons 430 than one or more others of the solar cells 410, or may be attached to the same number of the ribbons 430 as some of the solar cells 410 as well as a different number of the ribbons 430 than others of the solar cells 410. In some embodiments, the ribbons 430 may extend between, and/or may provide an electrical connection between, some of the solar cells 410.

By way of example, in some embodiments, as shown in the drawings, ribbon "R4" may extend between solar cell "S7" and solar cell "S8" of cover "C1," thereby providing an electrical connection between solar cell "S7" and solar cell "S8." By way of another example, in some embodiments, as shown in the drawings, ribbon "R5" may extend between solar cell "S9" and solar cell "S10" of cover "C2," thereby providing an electrical connection between solar cell "S9" and solar cell "S10."

As shown in the drawings, in some embodiments, one or more of ribbon "R1," ribbon "R2," and/or ribbon "R3" of the photovoltaic module 200 may extend in a first direction. In some embodiments, one or more of ribbon "R4," and/or ribbon "R5" of the cover 400 may extend in a second direction. In some embodiments, the first direction may be perpendicular to the second direction. In some embodiments, the first direction may be parallel to the second direction. In some embodiments, the first direction may be neither perpendicular nor parallel to the second direction.

In some embodiments, the roofing system 100 includes the cover 400 with the active solar cell 410 may provide seventeen (17) solar cells per row, as compared to sixteen (16) solar cells that are provided by a roofing system that does not include an active solar cell on a cover. Accordingly, under certain environmental conditions, the roofing system 100 in accordance with the invention may provide 6.25% more power than a roofing system that does not include the active solar cell on a cover. In some embodiments, in the roofing system 100 that include the cover 400 having the active solar cell 410 and a photovoltaic module 200 with fifteen (15) solar cells, the roofing system 100 may provide 6.7% more power than a roofing system that does not include the active solar cell on a cover.

As shown in FIGS. 1 and 2, the roofing system 100 may include at least one wire 600. In some embodiments, the roofing system 100 may include a plurality of wires 600. In some embodiments, the wire 600 may electrically connect components of the roofing system 100. In some embodiments, the wire 600 is an electrical cable. In some embodiments, the wire 600 is a flat ribbon electrical cable. In some embodiments, the wire 600 may electrically connect the solar cell 210 of a first one of the photovoltaic modules 200 and the solar cell 410 of a first one of the covers 400, such as through a bus or bussing, a wire or wires, and/or one or more additional and/or other electrical components. In some embodiments, the wire 600 may electrically connect the solar cell 210 of the first one of the photovoltaic modules 200 with the solar cell 210 of another, second one of the photovoltaic modules 200. In some embodiments, the wires 600 may be disposed within an interior of the wireway portions 300, and/or otherwise may be covered by the covers 400. In some embodiments, the wire 600 may be electrically connected to one or more bus bars and/or another component or other components of the photovoltaic module 200 and/or the cover 400, to electrically connect one or more of the solar cells 210 and/or one or more of the solar cells 410, for example.

By way of example, in some embodiments, as shown in the drawings, wire "W1" provides an electrical connection between solar cell "S1" of photovoltaic module "P1" and solar cell "S7" of cover "C1." Thus, in some embodiments, the solar cells and the ribbons of the cover or covers 400 provide an electrical connection to the solar cells of the photovoltaic module "P1," such that, for example, ends of the ribbons on an uppermost end of the roof deck 500 may provide an electrical connection to the solar cells of the photovoltaic module on a lowermost end on the roof deck 500. Therefore, in some embodiments of the invention, the roofing system 100 may not use a wire, such as a return wire within the wireway made up of the wireway portions 300, to provide an electrical connection at an uppermost end of the wireway on the roof deck, to the photovoltaic module at a lowermost end of the roof deck 500 including an electrical connection to the solar cells thereof. In some embodiments, the roofing system 100 may include a power optimizer, in order to integrate power produced by one or more of the covers 400 including the solar cells 410, with power produced by the solar cells 210 of the photovoltaic modules 200.

Although the figures show the covers 400 with the solar cells 410 spanning two photovoltaic modules 200, one or more of the covers may span one photovoltaic module, and/or may span more than two photovoltaic modules, such as three, four, five, or more than five photovoltaic modules, and in some embodiments may span all of the photovoltaic modules in the column of photovoltaic modules installed on the roof deck 500.

By way of another example, in some embodiments, as shown in the drawings, wire "W2" provides an electrical connection between solar cell "S3" of photovoltaic module "P2" and solar cell "S1" of photovoltaic module "P1.

"In some embodiments, a method comprises obtaining one or more of the components discussed herein, and/or one or more other components, and installing any or all of the components above a roof deck, as described.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A system, comprising:
   a roof deck;
   a first photovoltaic module installed on the roof deck,
      wherein the first photovoltaic module comprises a first solar cell;
   a first wireway portion installed on the roof deck,
      wherein the first wireway portion is proximate to an end of the first photovoltaic module,
         wherein the first wireway portion comprises at least one slot; and
   a first cover,
      wherein the first cover is removably attached to the first wireway portion,
      wherein the first cover comprises a second solar cell and at least one rail, and
      wherein the at least one rail is removably retained within the at least one slot.

2. The system of claim 1, wherein the first photovoltaic module further comprises:
   a third solar cell, and
   a first ribbon,
      wherein the first ribbon extends between the first solar cell and the third solar cell in a first direction,
      wherein the first ribbon is in electrical communication with the first solar cell and the third solar cell;
   wherein the first cover further comprises:
      a fourth solar cell, and
      a second ribbon,
      wherein the second ribbon extends between the second solar cell and the fourth solar cell in a second direction,
      wherein the second ribbon is in electrical communication with the second solar cell and the fourth solar cell,
         wherein the second direction is different than the first direction.

3. The system of claim 2, wherein the second direction is perpendicular to the first direction.

4. The system of claim 1, further comprising:
   a second photovoltaic module installed on the roof deck,
      wherein the second photovoltaic module comprises a third solar cell;
   a second wireway portion installed on the roof deck,
      wherein one side of the second wireway portion is proximate the second photovoltaic module,
      wherein another side of the second wireway portion is proximate the first wireway portion; and
   a second cover,
      wherein the second cover is removably attached to the second wireway portion,
   wherein the second cover comprises a fourth solar cell.

5. The system of claim 1, further comprising:
   a second photovoltaic module installed on the roof deck,
      wherein the second photovoltaic module comprises a third solar cell,
      wherein a portion of second photovoltaic module is proximate the first photovoltaic module,
      wherein the first wireway portion is proximate the second photovoltaic module;
   wherein the first cover further comprises a fourth solar cell.

6. The system of claim 5, further comprising:
   a first wire,
      wherein the first wire is in electrical communication with the first solar cell of the first photovoltaic module and the second solar cell of the first cover; and
   a second wire,
      wherein the second wire is in electrical communication with the third solar cell of the second photovoltaic module and the first solar cell of the first photovoltaic module.

7. The system of claim 1, further comprising:
   a second photovoltaic module installed on the roof deck,
      wherein the second photovoltaic module comprises a third solar cell,
      wherein the second photovoltaic module is proximate the first photovoltaic module;
   a third photovoltaic module installed on the roof deck,
      wherein the third photovoltaic module comprises a fourth solar cell,
      wherein the third photovoltaic module is proximate the second photovoltaic module; and
   a second wireway portion installed on the roof deck,
      wherein the second wireway portion is proximate the third photovoltaic module,
   wherein the first cover further comprises:
      a fifth solar cell, and
      a ribbon,
         wherein the ribbon extends between the second solar cell and the fifth solar cell,
         wherein the ribbon is in electrical communication with the second solar cell and the fifth solar cell,
         wherein the first cover is removably attached to the first wireway portion and the second wireway portion.

8. The system of claim 7, further comprising:
   a first wire,
      wherein the first wire is in electrical communication with the first solar cell of the first photovoltaic module and the second solar cell of the first cover;
   a second wire,
      wherein the second wire is in electrical communication with the first solar cell of the first photovoltaic module and the third solar cell of the second photovoltaic module; and
   a third wire,
      wherein the third wire is in electrical communication with the fourth solar cell of the third photovoltaic module and the third solar cell of the second photovoltaic module, and
      wherein an end of the ribbon is in electrical communication with the first solar cell of the first photovoltaic module.

9. The system of claim 1, wherein the first cover comprises a top surface, wherein the top surface comprises a channel, wherein the second solar cell is positioned within the channel.

10. A method, comprising:
   obtaining a first photovoltaic module,
      wherein the first photovoltaic module comprises a first solar cell;
   obtaining a first wireway portion,
      wherein the first wireway portion comprises at least one slot;
   obtaining a first cover,
      wherein the first cover comprises a second solar cell and at least one rail;
   installing the first photovoltaic module on a roof deck;

installing the first wireway portion on the roof deck, such that the first wireway portion is proximate an end of the first photovoltaic module; and removably attaching the first cover to the first wireway portion, wherein the at least one rail is removably retained within the at least one slot.

11. The method of claim 10, wherein the first photovoltaic module further comprises:
a third solar cell, and
a first ribbon,
wherein the first ribbon extends between the first solar cell and the third solar cell in a first direction,
wherein the first ribbon is in electrical communication with the first solar cell and the third solar cell;

wherein the first cover further comprises:
a fourth solar cell, and
a second ribbon,
wherein the second ribbon extends between the second solar cell and the fourth solar cell in a second direction,
wherein the second ribbon is in electrical communication with the second solar cell and the fourth solar cell,
wherein the second direction is different than the first direction.

12. The method of claim 11, wherein the second direction is perpendicular to the first direction.

13. The method of claim 10, further comprising:
obtaining a second photovoltaic module,
wherein the second photovoltaic module comprises a third solar cell;
obtaining a second wireway portion;
obtaining a second cover,
wherein the second cover comprises a fourth solar cell,
wherein the fourth solar cell is in electrical communication with the second solar cell;
installing the second photovoltaic module on the roof deck;
installing the second wireway portion on the roof deck, such that:
one side of the second wireway portion is proximate an end of the second photovoltaic module, and
another side of the second wireway portion is proximate a side of the first wireway portion; and
removably attaching the second cover to the second wireway portion.

14. The method of claim 10, further comprising:
obtaining a second photovoltaic module,
wherein the second photovoltaic module comprises a third solar cell; and installing the second photovoltaic module on the roof deck, such that:
a portion of second photovoltaic module is proximate the first photovoltaic module, and
an end of the second photovoltaic module is proximate the first wireway portion.

15. The method of claim 14, wherein the first cover further comprises a fourth solar cell;
wherein the method further comprises:
obtaining a first wire;
obtaining a second wire;
installing the first wire to electrically connect the first solar cell and the second solar cell; and
installing the second wire to electrically connect the third solar cell and the fourth solar cell.

16. The method of claim 10, wherein the first cover further comprises:
a fifth solar cell, and
a ribbon,
wherein the ribbon extends between the second solar cell and the fifth solar cell,
wherein the ribbon is in electrical communication with the second solar cell and the fifth solar cell;
wherein the method further comprises:
obtaining a second photovoltaic module,
wherein the second photovoltaic module comprises a third solar cell;
obtaining a third photovoltaic module,
wherein the third photovoltaic module comprises a fourth solar cell;
obtaining a second wireway portion;
installing the second photovoltaic module on the roof deck, such that the second photovoltaic module is proximate the first photovoltaic module;
installing the third photovoltaic module on the roof deck, such that the third photovoltaic module is proximate the second photovoltaic module;
installing the second wireway portion on the roof deck, such that one side of the second wireway portion is proximate an end of the third photovoltaic module; and
removably attaching the first cover is removably attached to the first wireway portion and the second wireway portion.

17. The method of claim 16, further comprising:
obtaining a first wire;
obtaining a second wire;
obtaining a third wire;
installing the first wire to electrically connect the first solar cell and the second solar cell;
installing the second wire to electrically connect the first solar cell and the third solar cell; and
installing the third wire to electrically connect the fourth solar cell and the third solar cell.

18. The method of claim 10, wherein the first cover comprises a top surface, wherein the top surface comprises a channel, wherein the second solar cell is positioned within the channel.

19. A system, comprising:
a roof deck;
a first photovoltaic module installed on the roof deck,
wherein the first photovoltaic module comprises
a first solar cell,
a second solar cell, and
a first ribbon,
wherein the first ribbon extends between the first solar cell and the second solar cell in a first direction,
wherein the first ribbon is in electrical communication with the first solar cell and the second solar cell;
a first wireway portion installed on the roof deck,
wherein the first wireway portion is proximate to an end of the first photovoltaic module; and
a first cover,
wherein the first cover is removably attached to the first wireway portion,
wherein the first cover comprises
a third solar cell,
a fourth solar cell, and
a second ribbon,
wherein the second ribbon extends between the third solar cell and the fourth solar cell in a second direction, wherein the second direction is different than the first direction, and wherein the second ribbon is in electrical communication with the third solar cell and the fourth solar cell.

20. The system of claim 19, wherein the second direction is perpendicular to the first direction.

\* \* \* \* \*